United States Patent
Obeid et al.

(10) Patent No.: US 9,158,600 B2
(45) Date of Patent: *Oct. 13, 2015

(54) SYSTEM AND METHOD FOR AUTOMATING THE TRANSFER OF A DATA FROM A WEB INTERFACE TO A DATABASE OR ANOTHER WEB INTERFACE

(75) Inventors: Diya Obeid, New York, NY (US); Charbel Rouhana, Jersey City, NJ (US)

(73) Assignee: JobDiva, Inc., New York, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 12/966,615

(22) Filed: Dec. 13, 2010

(65) Prior Publication Data

US 2011/0145716 A1    Jun. 16, 2011

Related U.S. Application Data

(63) Continuation-in-part of application No. 11/856,586, filed on Sep. 17, 2007, now Pat. No. 8,141,107.

(60) Provisional application No. 60/844,646, filed on Sep. 15, 2006.

(51) Int. Cl.
    *G06F 9/54*      (2006.01)
    *G06Q 10/10*     (2012.01)
    *G06F 17/30*     (2006.01)
    *G01W 1/00*      (2006.01)

(52) U.S. Cl.
    CPC .......... *G06F 9/541* (2013.01); *G06F 17/30861* (2013.01); *G06Q 10/10* (2013.01)

(58) Field of Classification Search
    USPC ....................................................... 719/329
    See application file for complete search history.

(56) References Cited

U.S. PATENT DOCUMENTS

| | | | |
|---|---|---|---|
| 6,912,719 B2 | 6/2005 | Elderon et al. | |
| 6,944,651 B2 | 9/2005 | Onyon et al. | |
| 6,948,174 B2 | 9/2005 | Chiang et al. | |
| 7,076,521 B2 | 7/2006 | Davison | |
| 7,200,804 B1 * | 4/2007 | Khavari et al. | 715/230 |

(Continued)

FOREIGN PATENT DOCUMENTS

JP    2002099561 A  *  4/2002

OTHER PUBLICATIONS

JP, 2002-099561 English translation (pp. 1-15).*
International Search Report No. PCT/US07/78677, dated Mar. 12, 2008, 1 page.

(Continued)

*Primary Examiner* — Andy Ho
*Assistant Examiner* — Abdou Seye
(74) *Attorney, Agent, or Firm* — Greenberg Traurig, LLP

(57) ABSTRACT

Access information is received for a data sender interface accessible over a network and a data receiver interface accessible over the network. A set of navigation steps necessary to access data fields on the sender interface are determined. The data fields on the data sender interface are automatically mapped to data fields on the data receiver interface using at least one data mapping rule, such that a set of data field mappings is created. A data transfer scenario is generated using the set of navigation steps and the set of data field mappings, such that the data transfer scenario specifies a set of operations for transferring data from the sender interface to the receiver interface. The data transfer scenario is stored to computer readable media and can be executed any number of times to transfer data from the sending interface to the receiving interface.

54 Claims, 11 Drawing Sheets

(56) References Cited

U.S. PATENT DOCUMENTS

| | | |
|---|---|---|
| 7,650,325 B2 | 1/2010 | Bader et al. |
| 2004/0162675 A1* | 8/2004 | Moon et al. ................ 702/3 |
| 2006/0002317 A1* | 1/2006 | Punaganti Venkata ....... 370/310 |
| 2006/0041618 A1 | 2/2006 | Chang |
| 2006/0075391 A1* | 4/2006 | Esmonde et al. ............. 717/136 |
| 2006/0276997 A1* | 12/2006 | Drees ........................... 702/182 |

OTHER PUBLICATIONS

Knoblock et al., "Modeling Web Sources for Information Integration", Proc. AAAI, Nat. Conf. on Artificial Intelligence, XP 001152196, 9 pages.

Baumgartner et al., "Visual Programming of Web Data Aggregation Applications", XP 002578083, 6 pages.

* cited by examiner

Data Field Thesaurus (300)

| Receiving Data Field (310) | Sending Data Field (320) |
|---|---|
| Contact | Assigned To; Customer Account Managers; Coordinator; Owner; Distributor; Recruiter; Primary Recruiter; Pro Contact; Hiring Manager; Manager; MSP Contact; Staffing Specialist; Competency Center Specialist; Owner; Sponsor; Class Contact; Requester; Person; Staffing Manager; Posted By; Created By; Requisition Owners |
| Optional Ref # | Order #; Position Pool ID#; Req ID; System ID; Client Name; Work Order #; Req #; Position #; Link/Requisition; Number; Job Number; ; Reference #; Job Req #; SRID; Job Code |
| Status | Order Status; Job Status; Req. Status; Position Status; Notification Type; Worked By Activity; App. Status; Status and Auction Remaining Time; Shift Status |
| Location | Contractor Work Location; Work Location; Work Site; Location, City, State, Zip; Location Name; Position Location; Facility |
| Company Department | Buyer; Client Name; Client; Organization; Hiring Firm; Company; Customer; Hiring Company |
| Start Date | Engagement Start Date; Target Start Date; Period; Job Start Date; Proposed Start Date; |
| End Date | Engagement End Date; End Date; Period; Job End Date; Proposed End Date |
| Bill Rate (High/Low) | Final Bill Rate; Bill Range; Maximum Rate; Target Bill Rate; Rate Range; Proposed Bill Rate; Target Rate; Net Placement Fee; Cost Rate; Maximum Bill Rate; Fee |
| Pay Rate (High/Low) | Pay Rate; Target Pay Rate; Base Salary |

FIG. 3A

| | |
|---|---|
| Title | Actual Job Title; Position Title; Job Title; Position; Role; Company Name Job Title; Name; Internal Job Title; Collaboration Title |
| Openings/Fills | Positions; # Available Positions; Quantity; Positions Requested; No. of Openings; # Associates Reqs./Filled; Quantity Needed; Number Needed; Number Positions; Open Positions; Number of People Needed; |
| Description | Requirement Notes; Comment; Job Description; Skills; Requirements; Short Description; Complete Description; Role Description; Required/Desired Skills; Duties; Education; Additional Job Description; Description of Duties; Qualifications Required; Summary; Job Requirements; Position Requirements; Job Duties; Minimum Required Skills; Competencies; Preferred Skills; Position Summary; Position Requirements; Position Skills and Qualifications; Position Description; Department Overview; Job Duties and Expertise; Project Description; Technical Environment; Other Standards; Project Name; |
| Remarks | Education; Company Benefits; Comments; Hire Details; Work Environment; Additional Information; Request Notes; Other Comments (viewed by all vendors); Pre Screening Questions; Additional Instructions; Next Steps |
| Attachments | Job Title Doc; Hiring Specifications Required; Hiring Specifications Preferred; Test Attached |

FIG. 3B

| SENDING WEBSITE (420) | CONTACT | OPTIONAL REF # | STATUS | LOCATION | COMPANY/ DEPARTMENT | START DATE |
|---|---|---|---|---|---|---|
| PROCURESTAFF-MSP | ASSIGNED TO | ORDER # | ORDER STATUS | CONTRACTOR WORK LOCATION | | ENGAGEMENT START DATE |
| IQ NAVIGATOR | CUSTOMER ACCOUNT MANAGERS | POSITION POOL ID# | JOB STATUS | LOCATION | | START DATE |
| BEELINE | | ID | STATUS | | | TARGET START DATE |
| FIELDGLASS | COORDINATOR/OWNER/ DISTRIBUTOR | | | WORK LOCATION | BUYER | PERIOD |
| RECRUITMAX | RECRUITER/PRIMARY RECRUITER | | | | | |
| PEOPLECLICK-VMS | | REQ ID/ SYSTEM ID | REQ STATUS | | CLIENT NAME | |
| WAND-PROUNLIMITED | PRO CONTACT | ORDER NUMBER | | | CLIENT | JOB START DATE |
| PROCURESTAFF-NCR | CONTACT | ORDER# | | WORK LOCATION | | |
| MYWORKCARD | HIRING MANAGER | CLIENT NAME WORK ORDER # | | WORK LOCATION, WORK SITE NAME | | PROPOSED START DATE |
| WORK NEXUS | | REQ # | | LOCATION, CITY STATE ZIP | | |
| WORKFORCE LOGIC | MANAGER | | | | | |
| ENHANCED WAND PROUNLIMITED | MSP CONTACT | | | | | |
| FORD BUYER2BUYER WORKFORCE-MSX | STAFFING SPECIALIST/COMPETNENCY CENTER SPECIALIST | POSITION NUMBER | POSITION STATUS/ NOTIFICATION TYPE | LOCATION NAME | | |
| CLICK COMMERCE eLANCE-SMART LABOR | OWNER/SPONSOR | | | | ORGANIZATION | |
| PROCURESTAFF - MANAGED SERVICE PROGRAM | | REQST# | | | | |

400

410 → FIELD TITLES

| END DATE | BILL RATE (HIGH AND LOW) | PAY RATE (HIGH AND LOW) | TITLE | OPENINGS/ FILLS | DESCRIPTION | REMARKS | ATTACHMENTS |
|---|---|---|---|---|---|---|---|
| ENGAGEMENT END DATE | | | ACTUAL JOB TITLE | POSITIONS | REQUIREMENT NOTES | | |
| END DATE | BILL RATE | PAY RATE | POSITION TITLE | # AVAILABLE POSITIONS | DESCRIPTION/ COMMENT | EDUCATION, COMPANY BENEFITS | |
| | | | JOB TITLE/ POSITION | QTY | JOB DESCRIPTION, SKILLS | | |
| PERIOD | FINAL BILL RATE | | TITLE | POSITIONS REQUESTED | DESCRIPTION | COMMENTS | |
| | | | JOB TITLE | | REQUIREMENTS | | |
| | BILL RANGE | | TITLE/ ROLE | NO OF OPENINGS | SHORT DESCRIPTION, COMPLETE DESCRIPTION, ROLE DESCRIPTION, REQUIRED/DESIRED SKILLS | | |
| JOB END DATE | | | | | DUTIES, SKILLS, EDUCATION | | |
| | MAXIMUM RATE | | | | JOB DESCRIPTION, ADDITIONAL JOB DESCRIPTION | | |
| PROPOSED END DATE | TARGET BILL RATE | TARGET PAY RATE | | # ASSOCIATES REQ/FILLED | DESCRIPTION OF DUTIES, QUALIFICATIONS REQUIRED | | |
| | RATE RANGE | | (COMPANY NAME) JOB TITLE | NUMBER OF OPENINGS | SUMMARY, JOB REQUIREMENTS | | |
| | PROPOSED BILL RATE | | | QUANTITY NEEDED | | HIRE DETAILS, WORK ENVIRONMENT | JOB TITLE DOC |
| | TARGET RANGE | | POSITION TITLE | | | ADDITIONAL INFORMATION | |
| | | | NAME | | POSITION REQUIREMENTS | | |

FROM FIG. 4A-1

| | | JOB DUTIES | REQUEST NOTES |
|---|---|---|---|
| | | #NEEDED / #POSITIONS | |
| | OPENINGS | COMMENTS, MINIMUM REQUIRED SKILLS/ COMPETENCIES, PREFERRED SKILLS | OTHER COMMENTS (VIEWED BY ALL VENDORS) |
| NET PLACEMENT FEE | | POSITION SUMMARY, POSITION REQUIREMENTS, SKILLS AND QUALIFICATIONS, POSITION DESCRIPTION | PRESCREENING QUESTIONS |

(FROM FIG. 4A-2 / FROM FIG. 4A-3)

FIG. 4A-4

| System | Col2 | Col3 | Col4 | Col5 |
|---|---|---|---|---|
| i-GRASP -AGENCY EXTRANET | PERSON | REF NO | | |
| eWORK PROSOURCE | | JOB REQUISTION # | APP STATUS | |
| iCIMS SYSTEM | RECRUITER | | | |
| COLLASYS | | | STATUS AND AUCTION REMAINING TIME | |
| ARIBA SUPPLIER NETWORK | | | | CUSTOMER |
| AT&T-eTEMP SYSTEM (eCAM) | STAFFING MANAGER | SRID | | PROJECT LOCATION INFORMATION |
| NEXTSOURCE - TALENT ACQUISTION MANAGEMENT SOLUTION (TAMS) | | | | |
| MULTIPLE PLACEMENT SERVICE | POSTED BY | | | |
| SHIFTWISE | CREATED BY | | SHIFT STATUS | FACILITY |
| TALEO | REQUISTION OWNERS | JOB CODE | | |
| FRONT OFFICE EXCHANGE (FOX) | | | | HIRING COMPANY |
| RECRUITALLIANCE | | J CODE | | |

| | | INTERNAL JOB TITLE | DEPARTMENT OVERVIEW | |
|---|---|---|---|---|
| | COST RATE | | JOB DUTIES & EXPERTISE | |
| | | # OF POSITIONS | | HIRING SPECIFICATIONS REQUIRED, HIRING SPECIFICATIONS PREFERRED |
| | | | PROJECT DESCRIPTION, TECHNICAL ENVIRONMENT, OTHER STANDARDS | |
| FROM FIG. 4B-1 | | COLLABORATION TITLE | QUANTITY | FULL DESCRIPTION |
| | | OPEN POSITIONS | PROJECT NAME, PROJECT DESCRIPTION, JOB DESCRIPTION | |
| | MAXIMUM BILL RATE | NUMBER OF PEOPLE NEEDED | ADDITIONAL INSTRUCTIONS | TEST ATTACHED |
| | | | | |
| | | | | |
| | | | NEXT STEPS | |
| | | | | |
| | FEE | BASE SALARY | | |

FIG. 4B-2

SYSTEM AND METHOD FOR AUTOMATING THE TRANSFER OF A DATA FROM A WEB INTERFACE TO A DATABASE OR ANOTHER WEB INTERFACE

The present application is a continuation-in-part of U.S. application Ser. No. 11/856,586 filed on Sep. 17, 2007, Now U.S. Pat. No. 8,141,107 which claims the benefit of Provisional U.S. Patent Application Ser. No. 60/844,646, filed on Sep. 15, 2006, the entire disclosures of which are hereby incorporated by reference in their entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The instant disclosure relates to the field of data transfer, and in particular to a system and method for automating the transfer of data from a web interface to a database or another web interface.

BACKGROUND OF THE INVENTION

Widespread adoption of the Internet by the public and the business world has lead to increasing amounts of data and information being available on-line. Several Internet-based methods for transmitting information exist, but the method is typically chosen by the sender without input from the receiver. While the Internet was in its infancy, e-mail was the most popular means for transmitting information, whereas today, web pages are increasingly more popular means for transmitting information. Web page delivery has become popular with senders due to its cross-platform compatibility, convenience, flexibility, and ease of management. Receivers can navigate web pages to retrieve information or data using hyperlinks, buttons, arrows, or the like, which can lead to other web pages containing more information or data.

SUMMARY OF THE INVENTION

In one embodiment, is a method. Access information is received, using a computing device, for a data sender interface accessible over a network. Access information is received, using the computing device, for a data receiver interface accessible over the network. A set of navigation steps necessary to access data fields on the sender interface are determined using the computing device. The data fields on the data sender interface are then automatically mapped, using the computing device, to data fields on the data receiver interface using at least one data mapping rule, such that a set of data field mappings is created. A data transfer scenario is generated, using a computing device, using the set of navigation steps and the set of data field mappings, such that the data transfer scenario specifies a set of operations for transferring data from the sender interface to the receiver interface. The data transfer scenario is stored to computer readable media and can be executed any number of times to transfer data from the sending interface to the receiving interface.

In one embodiment, the invention is a computing device comprising a processor memory and a storage medium for tangibly storing thereon program logic for execution by the processor. In one embodiment, the program logic comprises: receiving logic for receiving access information for a data sender interface accessible over a network; receiving logic for receiving access information for a data receiver interface accessible over the network; navigation logic for determining a set of navigation steps necessary to access data fields on the sender interface; mapping logic for automatically mapping the data fields on the data sender interface to data fields on the data receiver interface using at least one data mapping rule, such that a set of data field mappings is created; generation logic for generating a data transfer scenario using the set of navigation steps and the set of data field mappings, such that the data transfer scenario specifies a set of operations for transferring data from the sender interface to the receiver interface; and storing logic for storing the data transfer scenario to computer readable media. In one embodiment, the data transfer scenario can be executed any number of times to transfer data from the sending interface to the receiving interface.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 3A and 3B illustrate one embodiment of set of rules for mapping data files comprising a thesaurus.

FIGS. 4A-1 through 4A-4 and FIGS. 4B-1 through 4B-2 illustrate one embodiment of a mapping report displaying field mapping for multiple receiving data fields for multiple sending websites.

DETAILED DESCRIPTION

Figure 1:
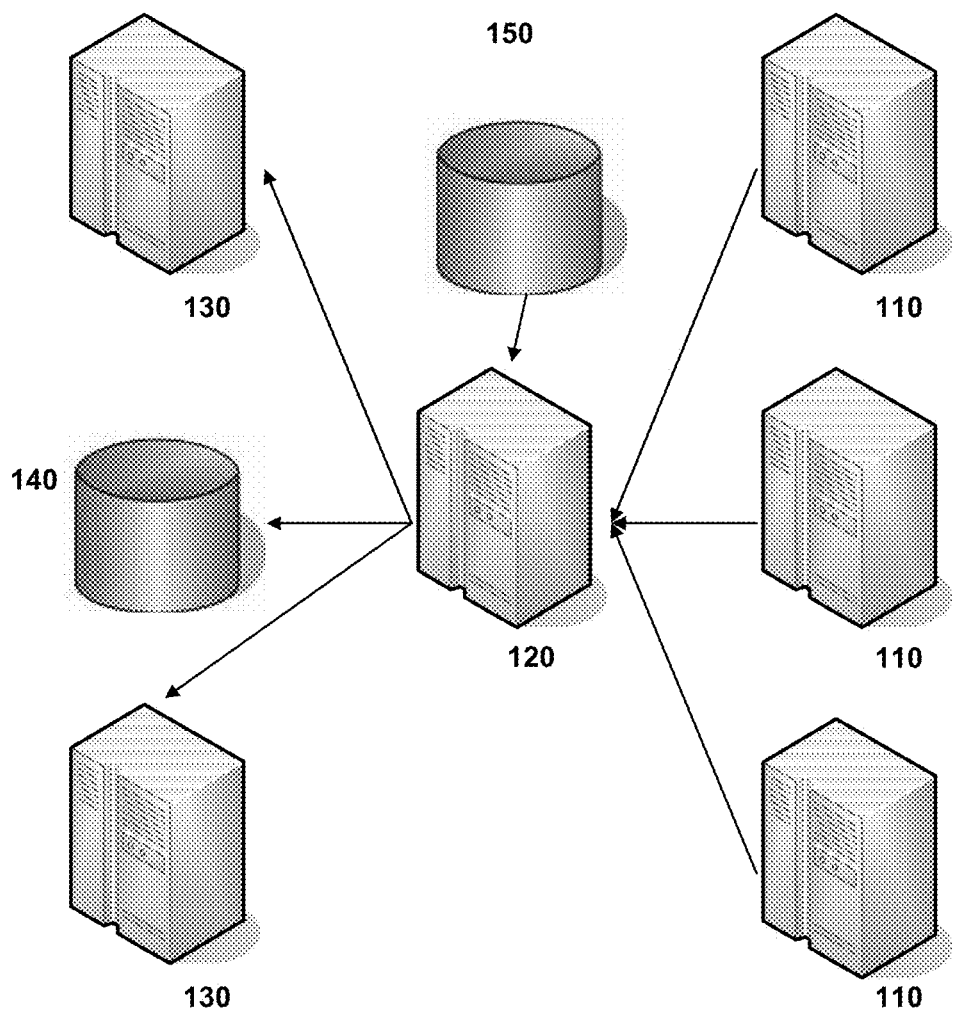
FIG. 1 illustrates some embodiments of a system architecture for automating the transfer of data from a web interface to another.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Reference will now be made in detail to embodiments of the disclosed system and method for automating the transfer of data from a web interface to a database or another web interface, examples of which are illustrated in the accompanying drawings.

The parent application of this application, U.S. application Ser. No. 11/856,586, describes systems and methods for automating the transfer of data from a web interface to another web interface. In some embodiments, the system described in the Ser. No. 11/856,586 application, provides a scenario designer that enables a user to interactively map fields on a sending web interface to fields on a receiving web interface and generate a data transfer scenario for transferring data from the sending interface to the receiving interface. In some embodiments, the Ser. No. 11/856,586 application additionally provides a scenario executor that transfers data from sending web interfaces to receiving web interfaces using data transfer scenarios generated by the scenario designer.

In some embodiments, this application describes an automated scenario generation process that can substantially eliminate the need for, inter alia, interactively mapping a sending interface to a receiving interface using a scenario designer user interface. In some embodiments, the automated scenario generation process can use network addresses of sending and receiving interfaces and a set of data mapping rules to generate a data transfer scenario that can be used by a scenario executor to transfer data from the sending interface to the receiving interface.

In some embodiments, an automated scenario generation process could be supported by a set of one or more additional functions provided by the scenario designer of the Ser. No. 11/856,586 application, which could be accessed through the scenario designer's user interface. Alternatively, an automated scenario designer could be a stand-alone system that generates data transfer scenarios for input into a scenario executor or other automated data transfer processes. In some embodiments, data transfer scenarios generated by an automated scenario generator could be input to the scenario designer of the 11/856,586 for revision and finalization.

FIG. 1 illustrates some embodiments of a system architecture 100 for automating the transfer of data from a web interface to another. Data is housed on at least one sender web interface 110. The sender web interface 110 is communicatively coupled with a server 120 via a private or non-private network, such as, for example, the Internet. The server 120 can also be communicatively coupled with a receiver web interface 130 or a database 140.

In some embodiments, a data transfer application, or scenario executor, running on server 120, automates the transfer of data between sender web interface 110 and receiver web interface 130 and/or database 140 by performing one or more user-defined scripts. In some embodiments, data on sender interfaces, receiver interfaces, and databases are grouped in rows that belong to entities. Each entity owns a row of data fields, which are its attributes. In some embodiments, transfer of data is performed one row at a time. When there is a change in any of the data fields for any row, that field is transferred to the receiver database or web interface for update in that entity's record.

In some embodiments, the server 120 is also be communicatively coupled with one or more data mapping rules database 150 that can be used by an automated scenario generator to map sender web interface 110 data fields to receiver web interface fields 130 or database fields 140 and automatically generate data transfer scenarios.

The automated scenario generator and data transfer applications can comprise one or more forms, executable on a networked computing device, such as, but not limited to, compiled, stand-alone machine code, such as that written in Visual C++, Visual Basic, Delphi, or the like; run-time scripts, such as those written in JavaScript, Visual Basic Script, or the like; macros, command level files, or the like.

An automated data transfer system could be used to transfer any type of data from one interface to another. For example, a user may want to store hourly weather readings for his locale in database 140. Sender web interface 110 may comprise a weather website requiring the user to provide login credentials prior to providing weather readings. The data transfer application can automatically provide the login credentials to sender web interface 110 on an hourly basis, retrieve the weather readings, and store them in database 140, without requiring any interaction by the user.

By way of another example, without limitation, a tax advisor may wish to automatically send state lottery winners promotional materials regarding services offered by the tax advisor. In this example, sender web interfaces 110 could comprise a state lottery website displaying the lottery winners' names and hometown as well as a phone directory website, for locating the lottery winners' home address. Receiver web interface 130 would comprise a printing website that the tax advisor uses to print promotional materials. The data transfer application can periodically query the state lottery website to retrieve the name(s) of new lottery winners. After receiving the name of a new lottery winner, the data transfer application would query the phone directory website to retrieve the lottery winner's home address. The data transfer application would then provide any necessary credentials, input the lottery winner's name and address into the printing website, and place an order to have promotional materials sent to the lottery winner. In both of the preceding examples, system architecture 100 and the scripts run by the data transfer application allow the user to transfer data between web interfaces and databases, while alleviating the burdens typically associated with doing so.

Figure 2:
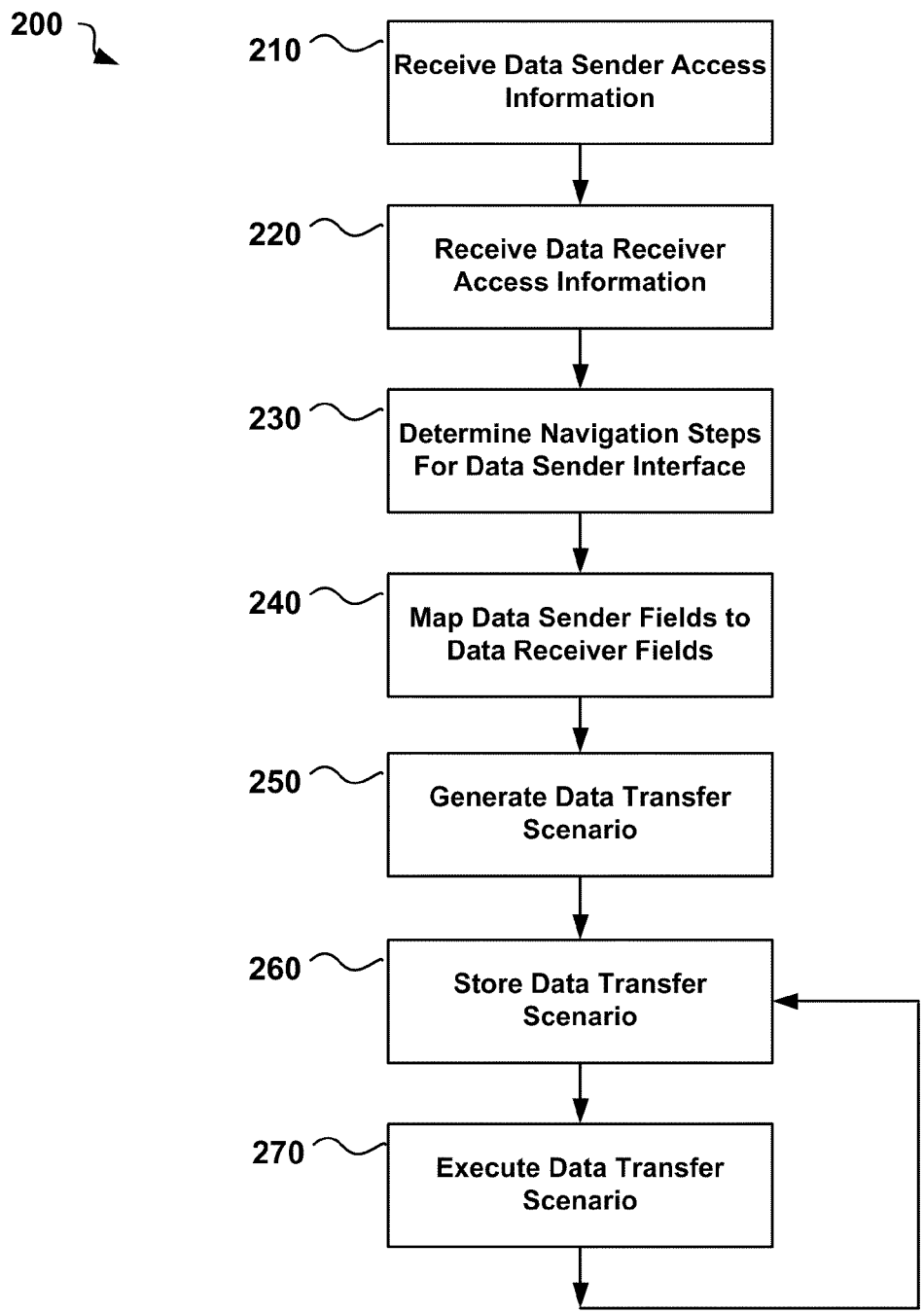
FIG. 2 illustrates one embodiment of a process for automating the transfer of data from a data sender interface to a database to a data receiver interface.

FIG. 2 illustrates a process for automating the transfer of data from a data sender interface to a database to a data receiver interface. Access information is received 210, using a computing device, for a data interface accessible over a network. Access information is received 220, using a computing device, for a data receiver interface accessible over a network. Navigation steps necessary to access information via the sender interface are determined 230 using a computing device. Fields on the data sender interface are then mapped, using the computing device, to fields on the data receiver interface 240. The navigation steps and the data field mappings are used to generate 250 a data transfer scenario. The data transfer scenario is stored 260 on a database or other computer-readable storage media. The data transfer scenario can then be executed 270 one to many times to transfer data from the sender interface to the receiver interface. These operations will now be discussed in detail.

In block 210 of FIG. 2, access information is received, using a computing device, for a data sender interface accessible over a network. In some embodiments, the data sender interface is a web site and the access information comprises a URL. In some embodiments, access information for the data sender interface additionally includes login credentials. In some embodiments, the network is the Internet and the web site is accessible over the Internet using the URL. In some embodiments, the network is a private network, for example, an intranet, and the data sender interface is a webpage accessible over the network.

In some embodiments, the data sender access information is received from a user, over a network, via a user interface. In some embodiments, the user interface provides elements to allow the entry of URL, for a network accessible sender interface. In some embodiments, the user interface additionally provides elements to allow the entry of login credentials for access to the data sender interface. In some embodiments, the user interface is provided by a scenario designer application such as is disclosed in U.S. application Ser. No. 11/856,586. In other embodiments, data sender interface access information could be provided via automated means, such as, for example, a batch script or an automated process that identifies potential data sources on the Internet (e.g. via a web search).

In block 220 of FIG. 2, access information is received, using a computing device, for a data receiver interface accessible over a network. In some embodiments, the data receiver interface is a web site and the access information comprises a URL. In some embodiments, access information for the data sender interface additionally includes login credentials. In some embodiments, the network is the Internet and the web site is accessible over the Internet using the URL. In some embodiments, the network is a private network, for example, an intranet, and the data sender interface is a webpage accessible over the network. In some embodiments, the data receiver interface is an interface for updating a database.

In some embodiments, the data receiver access information is received from a user, over a network, via a user interface. In some embodiments, the user interface provides elements to allow the entry of URL, for a network accessible receiver interface. In some embodiments, the user interface additionally provides elements to allow the entry of login credentials for access to the data receiver interface. In some embodiments, the user interface is provided by a scenario designer application such as is disclosed in U.S. application Ser. No. 11/856,586. In other embodiments, data receiver interface access information could be provided via automated means, such as, for example, a batch script or as a default option stored in a profile.

In block 230 of FIG. 2, navigation steps necessary to access information via the sender interface are then determined 230 using a computing device. In the case where a data sender interface is a website, information of interest may be located on multiple web pages that normally require one or more user interface actions to access the data. In one example, a website may initially display data using a summary list comprising a number of lines, where each line relates to a different person or business (e.g. a directory). More detailed information regarding the person or business may only be accessible by selecting a one of the lines on the list. In another example, information of interest may be displayed on multiple pages where navigation from page to page occurs by, for example, through a "Next" control.

A data transfer scenario needs sufficient information to navigate to interface elements that contain data of interest. This information may be gathered in a number of ways, some of which may be fully automated, and some of which may require more or less manual intervention on the part of a user. In some embodiments, data access information for the sender interface may point directly to an interface element, for example, a webpage, that contains all of the data of interest provided by the interface. In such case, no additional navigation information is required.

Commonly, however, websites are composed of multiple pages, and data of interest are located on multiple pages. In some embodiments, navigation information could be gathered by an automated process that maps all of the pages accessible through the website and identifies interface actions or links necessary to proceed from one page to another. In some embodiments, such functionality could be provided by a scenario designer operating in a batch mode. In another embodiment, the scenario designer requires control by a user.

In some embodiments, data interface navigation information could be collected by a scenario designer by monitoring user interaction with the sender web interface, such as is disclosed in U.S. application Ser. No. 11/856,586. In other embodiments, data navigation information could be gathered initially via an automated process. In another embodiment, automatically gathered information can be edited via a scenario designer user interface such as is disclosed in U.S. application Ser. No. 11/856,586. In one embodiment, data navigation information is stored on a database in association with an identification of an interface to which it relates.

In block 240 of FIG. 2, fields on the data sender interface are then automatically mapped, using the computing device, to fields on the data receiver interface. In some embodiments, the automated process uses a rule set to automatically map data values from the sender web interface to a data receiver interface or user defined variables without the need for user interaction. In some embodiments, data navigation steps for the interface are used by the mapping process to navigate from one element of the sender interface to the next for the purpose of mapping elements on each interface element (e.g. navigating through all the pages of a website and mapping fields on each page).

Figures 3, 4A:
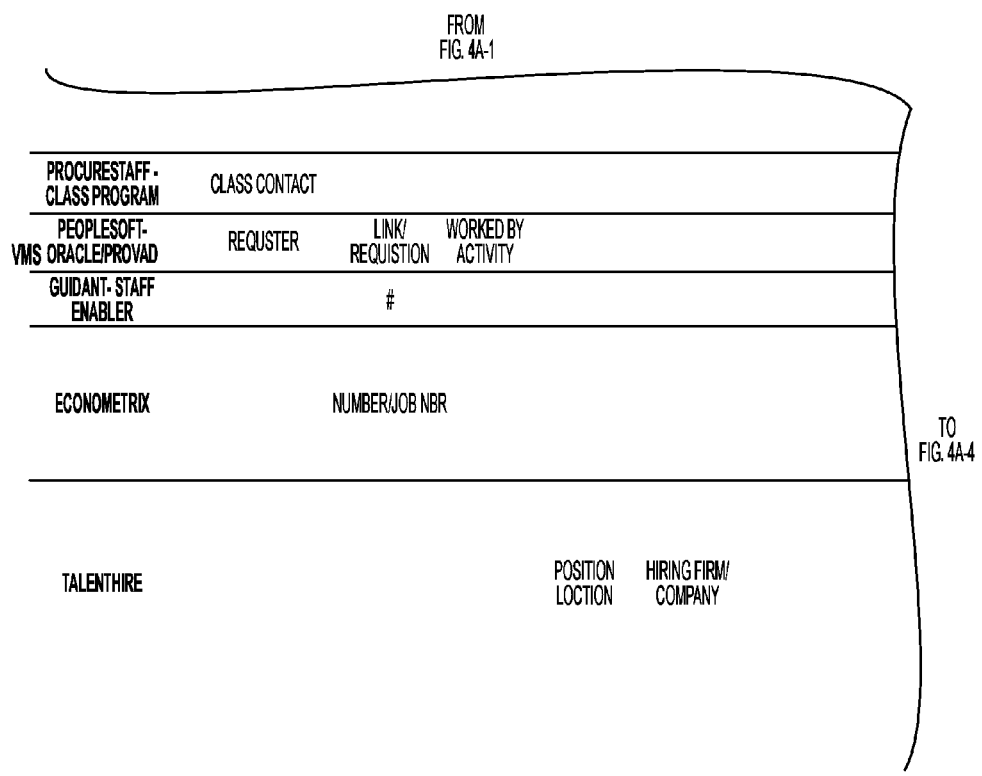

In some embodiments, the rule set is expressed as a thesaurus 300, such as that illustrated in FIG. 3. The thesaurus comprises one or more entries, each entry comprising a receiving data field 310 and one or more sending data fields 320. The receiving data fields 310 define data fields needed by a receiving website or a receiving database. The sending data fields 320 define data fields on sending websites that may correspond to the receiving data fields 310 i.e. are synonyms for the sending data fields. The thesaurus may be created using any technique known in the art, for example, using a spreadsheet.

In some embodiments, for each sending data interface, the elements of the sending interface (e.g. pages on a website) are searched for sending data fields 320, so literally or identified by the thesaurus. Where a sending data field 320 is found on a sending interface, it is mapped to the corresponding receiving data field for that sending interface and a data mapping rule is created. Each data mapping rule comprises an identification of one of the at least one data inputs on the receiver database or receiver web interface and at least one identification of one of the data fields on the sender web interface For example assume the field "Assigned To" (see FIG. 3, row 1) is found on some website XYZ. That field is mapped to the receiving field "Contact"

In some embodiments, automated data mapping could be performed without user interaction. In some embodiments, automated data mapping could be performed then be presented to the user for review, modification and approval using a scenario designer user interface such as is disclosed in U.S. application Ser. No. 11/856,586 for review, modification and approval. In one embodiment, data field mapping is stored on a database in association with an identification of an interface to which it relates.

In some embodiments, data mapping reporting functions can additionally be provided. FIG. 4 illustrates some embodiments of a mapping report 400. The report 410 displays field mapping for multiple receiving data fields 410 for multiple sending websites 420.

In block 250 of FIG. 2, navigation steps and data field mappings for a sender interface and a receiver data interface are then used to generate a data transfer scenario. In one embodiment, the data transfer scenario comprises sufficient information for an automated process to obtain data from the sender interface and transfer the information to the receiver interface. In one embodiment, such information can include data field mappings and control logic for navigating the sender interface and extracting information from interface elements. In some embodiments, such control logic can perform loop processing of data stored on a sender interface in a table, grid, or other similar format.

In some embodiments, data transfer scenario generation could be performed without user interaction. In some embodiments, data transfer scenario generation could be performed then be presented to the user for review, modification and approval using a scenario designer user interface such as is disclosed in U.S. application Ser. No. 11/856,586 for review, modification and approval.

In block 260 of FIG. 2, The data transfer scenario is stored 260 on a database or other computer readable media. In some embodiments, data transfer scenario generation and data transfer scenario execution are separate processes whose only relation to one another is through data transfer scenarios. In some embodiment, data transfer scenarios are generated for later use by one or more automated data transfer processes, such as, for example, a scenario executor.

In various embodiments, data transfer scenarios can take a number of different forms. In some embodiments, data transfer scenario generation compiles executable software which can be run by, for example, server 120 of FIG. 1 or other such device. In some embodiments, data transfer scenario generation creates scenarios comprising macros and routines which are executed by an automated data transfer application installed on a server such as, for example, server 120 of FIG. 1 or other such device. In one embodiment, data transfer scenarios are expressed as XML code that is capable of being executed an automated data transfer application. Appendices A through F of U.S. application Ser. No. 11/856,586 illustrate a number of exemplary XML based data transfer scenarios.

Figure 5:
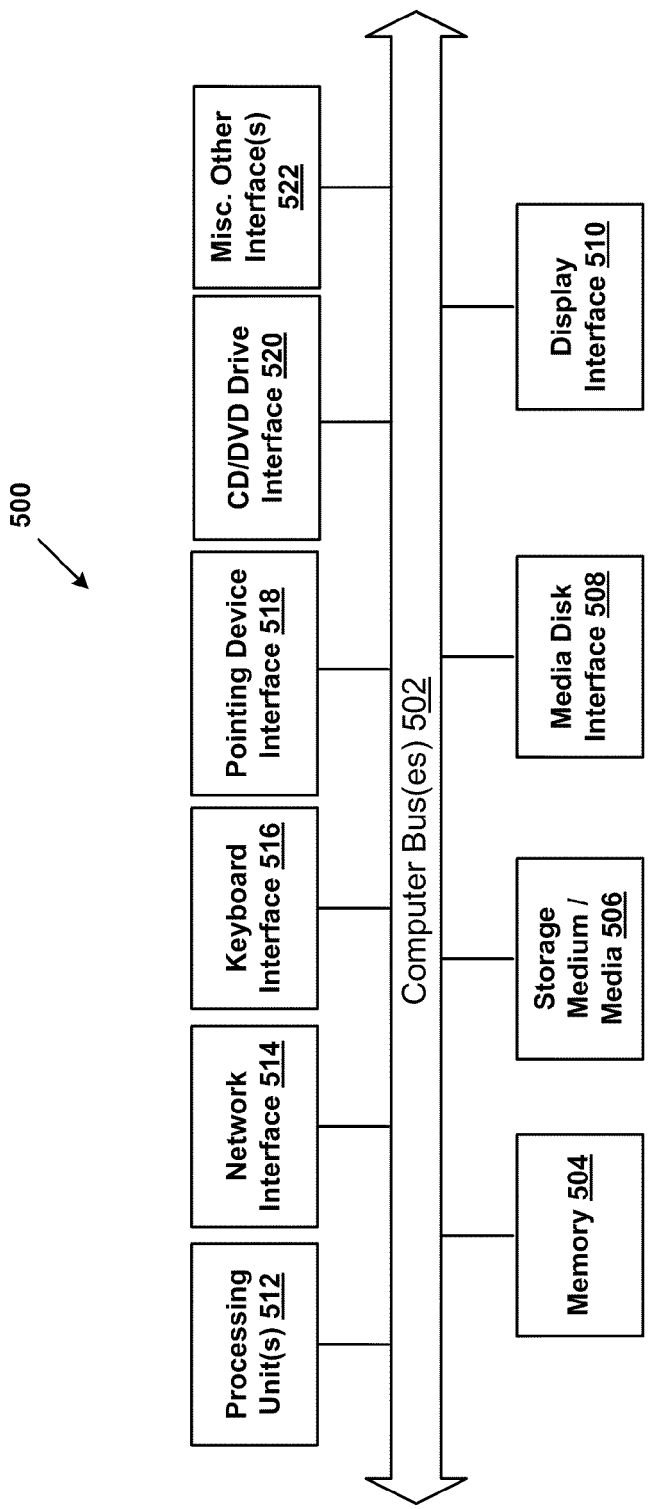
FIG. 5 is a block diagram illustrating an internal architecture of an example of a computing device.

FIG. 5 is a block diagram illustrating an internal architecture of an example of a computing device, such server 120 of FIG. 1, in accordance with one or more embodiments of the present disclosure. A computing device as referred to herein refers to any device with a processor capable of executing logic or coded instructions, and could be a server, personal computer, set top box, smart phone, pad computer or media device, to name a few such devices. As shown in the example of FIG. 5, internal architecture 510 includes one or more processing units (also referred to herein as CPUs) 512, which interface with at least one computer bus 502. Also interfacing with computer bus 502 are persistent storage medium/media 506, network interface 514, memory 504, e.g., random access memory (RAM), run-time transient memory, read only memory (ROM), etc., media disk drive interface 508 as an interface for a drive that can read and/or write to media including removable media such as floppy, CD-ROM, DVD, etc. media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces, a universal serial bus (USB) interface, and the like.

Memory 504 interfaces with computer bus 502 so as to provide information stored in memory 504 to CPU 512 during execution of software programs such as an operating system, application programs, device drivers, and software modules that comprise program code, and/or computer-executable process steps, incorporating functionality described herein, e.g., one or more of process flows described herein. CPU 512 first loads computer-executable process steps from storage, e.g., memory 504, storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage medium/media 506 is a computer readable storage medium(s) that can be used to store software and data, e.g., an operating system and one or more application programs. Persistent storage medium/media 506 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
    receiving access information, using a computing device, for a data sender interface accessible over a first network;
    receiving access information, using the computing device, for a data receiver interface accessible over a second network, wherein said second network is the same as or different from said first network;
    determining, using the computing device, a set of navigation steps necessary to access data fields on the sender interface;
    automatically mapping, using the computing device, the data fields on the data sender interface to data fields on the data receiver interface using at least one data mapping rule, such that a set of data field mappings is created;
    generating, using a computing device, a data transfer scenario using the set of navigation steps and the set of data field mappings, such that the data transfer scenario specifies a set of operations for transferring data from the sender interface to the receiver interface; and
    storing, using the computing device, the data transfer scenario to computer readable media.

2. The method of claim 1, such that the at least one data mapping rule comprises a thesaurus comprising one or more entries, each entry comprising a receiving data field and one or more sending data fields.

3. The method of claim 1, such that the data sender interface is a website, and determining a set of navigation steps comprises automatically identifying web pages accessible through the website and identifying interface actions necessary to navigate between the web pages.

4. The method of claim 1, such that the data sender interface is a website, and determining a set of navigation steps comprises monitoring user interaction with the website.

5. The method of claim 1, such that the access information for a data sender interface comprises a URL for a page on a website.

6. The method of claim 5, such that the access information for a data sender interface additionally comprises login credentials.

7. The method of claim 1, such that the access information for a data receiver interface comprises a URL for a page on a website.

8. The method of claim 1, such that the access information for a data receiver interface comprises a network address for an interface for updating a database.

9. The method of claim 1 comprising:
    executing, using the computing device, the data transfer scenario, such that data is transferred from the sender interface to the receiver interface in accordance with the data transfer scenario.

10. The method of claim 1, such that the data transfer scenario is executed automatically on a predetermined schedule.

11. The method of claim 1, such that the data transfer scenario is executed on-demand.

12. A computing device comprising:
    a processor;
    a storage medium for tangibly storing thereon program logic for execution by the processor, the program logic comprising:
        receiving logic for receiving access information for a data sender interface accessible over a first network;
        receiving logic for receiving access information for a data receiver interface accessible over a second network, wherein said second network is the same as or different from said first network;
        navigation logic for determining a set of navigation steps necessary to access data fields on the sender interface;
        mapping logic for automatically mapping the data fields on the data sender interface to data fields on the data receiver interface using at least one data mapping rule, such that a set of data field mappings is created;
        generation logic for generating a data transfer scenario using the set of navigation steps and the set of data field mappings, such that the data transfer scenario specifies a set of operations for transferring data from the sender interface to the receiver interface; and
        storing logic for storing the data transfer scenario to computer readable media.

13. The computing device of claim 12, such that the at least one data mapping rule comprises a thesaurus comprising one or more entries, each entry comprising a receiving data field and one or more sending data fields.

14. The computing device of claim 12, such that the data sender interface is a website, and the navigation logic determines the set of navigation steps by automatically identifying web pages accessible through the website and identifies interface actions necessary to navigate between the web pages.

15. The computing device of claim 12, such that the data sender interface is a website, and the navigation logic determines the set of navigation steps by monitoring user interaction with the website.

16. A computer-readable storage medium for tangibly storing thereon computer readable instructions for a method comprising:
    receiving access information for a data sender interface accessible over a first network;
    receiving access information for a data receiver interface accessible over a second network, wherein said second network is the same as or different from said first network;
    determining a set of navigation steps necessary to access data fields on the sender interface;
    automatically mapping the data fields on the data sender interface to data fields on the data receiver interface using at least one data mapping rule, such that a set of data field mappings is created;
    generating a data transfer scenario using the set of navigation steps and the set of data field mappings, such that the data transfer scenario specifies a set of operations for transferring data from the sender interface to the receiver interface; and storing the data transfer scenario to a second computer readable media.

17. The computer-readable storage medium of claim 16, such that the at least one data mapping rule comprises a thesaurus comprising one or more entries, each entry comprising a receiving data field and one or more sending data fields.

18. The computer-readable storage medium of claim 16, such that the data sender interface is a website, and determining a set of navigation steps comprises automatically identifying web pages accessible through the website and identifying interface actions necessary to navigate between the web pages.

19. A method comprising:
receiving access information, using a computing device, for a data sender interface accessible over a first network;
receiving access information, using the computing device, for a database accessible over a second network, wherein said second network is the same as or different from said first network;
determining, using the computing device, a set of navigation steps necessary to access data fields on the sender interface;
automatically mapping, using the computing device, the data fields on the data sender interface to data fields in the database using at least one data mapping rule, such that a set of data field mappings is created;
generating, using a computing device, a data transfer scenario using the set of navigation steps and the set of data field mappings, such that the data transfer scenario specifies a set of operations for transferring data from the sender interface to the database; and
storing, using the computing device, the data transfer scenario to computer readable media.

20. The method of claim 19, such that the at least one data mapping rule comprises a thesaurus comprising one or more entries, each entry comprising a receiving data field and one or more sending data fields.

21. The method of claim 19, such that the data sender interface is a website, and determining a set of navigation steps comprises automatically identifying web pages accessible through the website and identifying interface actions necessary to navigate between the web pages.

22. The method of claim 19, such that the data sender interface is a website, and determining a set of navigation steps comprises monitoring user interaction with the website.

23. The method of claim 19, such that the access information for a data sender interface comprises a URL for a page on a website.

24. The method of claim 19, such that the access information for a data sender interface additionally comprises login credentials.

25. The method of claim 19 comprising:
executing, using the computing device, the data transfer scenario, such that data is transferred from the sender interface to the database in accordance with the data transfer scenario.

26. The method of claim 19, such that the data transfer scenario is executed automatically on a predetermined schedule.

27. The method of claim 19, such that the data transfer scenario is executed on-demand.

28. A computing device comprising:
a processor;
a storage medium for tangibly storing thereon program logic for execution by the processor, the program logic comprising:
receiving logic for receiving access information for a data sender interface accessible over a first network;
receiving logic for receiving access information for a database accessible over a second network, wherein said second network is the same as or different from said first network;
navigation logic for determining a set of navigation steps necessary to access data fields on the sender interface;
mapping logic for automatically mapping the data fields on the data sender interface to data fields in the database using at least one data mapping rule, such that a set of data field mappings is created;
generation logic for generating a data transfer scenario using the set of navigation steps and the set of data field mappings, such that the data transfer scenario specifies a set of operations for transferring data from the sender interface to the database; and
storing logic for storing the data transfer scenario to computer readable media.

29. The computing device of claim 28, such that the at least one data mapping rule comprises a thesaurus comprising one or more entries, each entry comprising a receiving data field and one or more sending data fields.

30. The computing device of claim 28, such that the data sender interface is a website, and the navigation logic determines the set of navigation steps by automatically identifying web pages accessible through the website and identifies interface actions necessary to navigate between the web pages.

31. The computing device of claim 28, such that the data sender interface is a website, and the navigation logic determines the set of navigation steps by monitoring user interaction with the website.

32. A computer-readable storage medium for tangibly storing thereon computer readable instructions for a method comprising:
receiving access information for a data sender interface accessible over a first network;
receiving access information for a database accessible over a second network, wherein said second network is the same as or different from said first network;
determining a set of navigation steps necessary to access data fields on the sender interface;
automatically mapping the data fields on the data sender interface to data fields on the database using at least one data mapping rule, such that a set of data field mappings is created;
generating a data transfer scenario using the set of navigation steps and the set of data field mappings, such that the data transfer scenario specifies a set of operations for transferring data from the sender interface to the database; and
storing the data transfer scenario to a second computer readable media.

33. The computer-readable storage medium of claim 32, such that the at least one data mapping rule comprises a thesaurus comprising one or more entries, each entry comprising a receiving data field and one or more sending data fields.

34. The computer-readable storage medium of claim 32, such that the data sender interface is a website, and determining a set of navigation steps comprises automatically identifying web pages accessible through the website and identifying interface actions necessary to navigate between the web pages.

35. Computer program process code, tangibly stored on at least one non-transitory computer readable medium, the computer program process code comprising instructions implementing a scenario designer, comprising instructions for:
causing the scenario designer to enter an initialization mode, the initialization mode comprising:
i) receiving from a user a sender web interface from which information is to be obtained;
ii) displaying to the user the sender web interface within a web interface display area; and,
causing the scenario designer to enter run mode, the run mode comprising:
i) monitoring user interaction with the sender web interface to determine navigation steps;
ii) displaying a sender web interface to the user for each navigation step, and allowing the user to map data fields from the sender web interface to corresponding fields within a database or a recipient interface by selecting data fields on the sender web interface;
iii) storing a data field mappings; and
iv) storing the navigation steps; and,
generating a scenario from the stored data field mappings and the navigation steps.

36. The computer program according to claim 35, further comprising instructions for periodically causing a server to execute the scenario.

37. The computer program according to claim 35, wherein a plurality of sender web interfaces are received from the user as part of the initialization mode, and wherein the run mode is entered for each of the plurality of sender web interfaces.

38. The computer program according to claim 35, wherein the scenario comprises a series of instructions, interpretable by a server, for automating the retrieval of data.

39. The computer program of claim 38, wherein the scenario is stored on a server.

40. The computer program according to claim 35, further comprising causing the scenario designer to load a scenario and allowing the user to edit the stored data field mappings.

41. The computer program according to claim 35 wherein the run mode further comprises receiving a user formatting selection from the user via the scenario designer application, the user formatting selection comprising at least one function to be applied to a mapped sender web interface data field.

42. The computer program according to claim 41, wherein the user formatting selection is stored as part of the scenario.

43. The computer program of claim 42, wherein the data field is retrieved from the sender web interface via a server.

44. The computer program process code of claim 35, the initialization mode further comprising obtaining and storing any necessary credentials, and the scenario further comprising the credentials.

45. The computer program according to claim 35, wherein the first and second communications networks comprise the same communication network.

46. A data transfer method, comprising:
displaying a scenario designer application to a user;
receiving a sender web interface address from the user via the scenario designer application;
displaying, based on the received sender web interface address, a sender web interface to the user via the scenario designer application;
determining navigation steps by monitoring user interaction with the sender web interface;
receiving a sender web interface data field mapping from the user via the scenario designer application, the sender web interface data field mapping comprising a mapping of at least one sender web interface data field to at least one data field in a user database or a recipient web interface;
defining and storing a scenario, the scenario comprising the navigation steps and the sender web interface data field mapping.

47. The method of claim 46, further comprising receiving login credentials from the user and storing the login credentials as part of the scenario.

48. The method of claim 46, further comprising receiving a user formatting selection from the user via the scenario designer application, the user formatting selection comprising at least one function to be applied to a mapped sender web interface data field.

49. The method of claim 48, wherein the user formatting selection is stored as part of the scenario.

50. The method of claim 46, further comprising the steps of:
connecting to the sender web interface over a first communication network; and,
connecting to the receiver web interface over a second communication network;
wherein the first and second communications networks comprise the same communication network.

51. The method of claim 50, wherein at least one of the first communication network or the second communication network is an Internet.

52. The method of claim 46, wherein the sender web interface data field mapping further comprises a mapping between a sender web interface data field and at least one local data field.

53. The method of claim 52, wherein the sender web interface data field mapping further comprises a mapping between the at least one local data field and at least one data field in the recipient web interface.

54. The method of claim 46, further comprising:
connecting to the sender web interface over a first communication network;
retrieving a data field from the sender web interface, according to the scenario;
formatting the data field, according to the scenario, to create a formatted data field; and,
transmitting the formatted data field, from the server, to the user database or recipient interface over a second communication network, according to the scenario.

* * * * *